United States Patent [19]

Means et al.

[11] 4,373,183
[45] Feb. 8, 1983

[54] BUS INTERFACE UNITS SHARING A COMMON BUS USING DISTRIBUTED CONTROL FOR ALLOCATION OF THE BUS

[75] Inventors: Rodney J. Means, Tucson, Ariz.; Galen P. Plunkett, Jr,, Burke; Charles A. Dennis, Warrenton, both of Va.; John L. Moon, Washington, D.C.

[73] Assignee: IBM Corporation, Armonk, N.Y.

[21] Appl. No.: 179,904

[22] Filed: Aug. 20, 1980

[51] Int. Cl.³ .......................... G06F 3/04; H04Q 9/00
[52] U.S. Cl. ................................ 364/200; 340/825.5; 370/85
[58] Field of Search ... 364/200 MS File, 900 MS File; 340/825.51, 825.5; 370/85, 95

[56] References Cited

U.S. PATENT DOCUMENTS

| | | | |
|---|---|---|---|
| 3,818,447 | 6/1974 | Craft | 370/95 X |
| 4,096,569 | 6/1978 | Barlow | 364/200 |
| 4,177,450 | 12/1979 | Sarrand | 340/825.5 |

Primary Examiner—Raulfe B. Zache
Attorney, Agent, or Firm—John E. Hoel

[57] ABSTRACT

A distributed data processing system is disclosed which has truly distributed control. A plurality of bus interface units (BIU) are interconnected by the distributed system data bus (DSDB) which includes a clock line, a serial command line (CMD), a serial bus allocation line (BAL) and a two byte wide data bus. A central clock connected to the clock line which defines the message frame timing, is the only centralized "control" element in the system. Each BIU may in turn be connected to either one or several data processing units, an I/O port, or a bridge connecting to still another similar bus network.

18 Claims, 8 Drawing Figures

FIG. 1   DSDB SUB-BUS CONFIGURATION
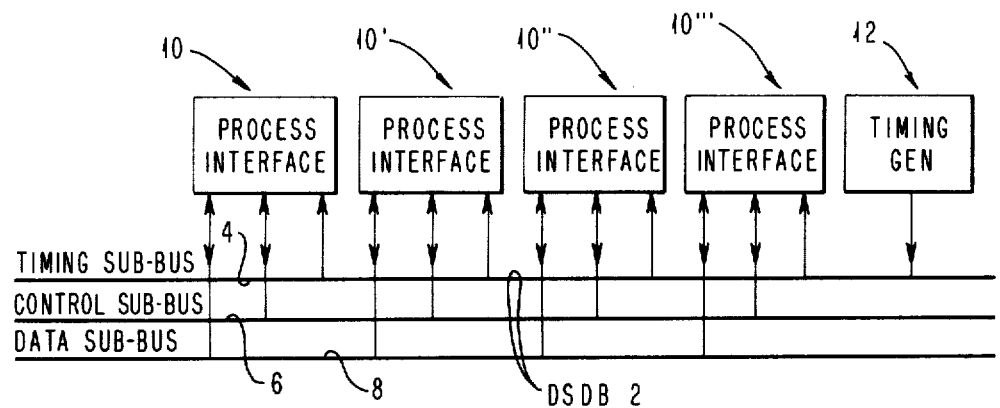
FIG. 2   DSDB SUB-BUS INTERFACE
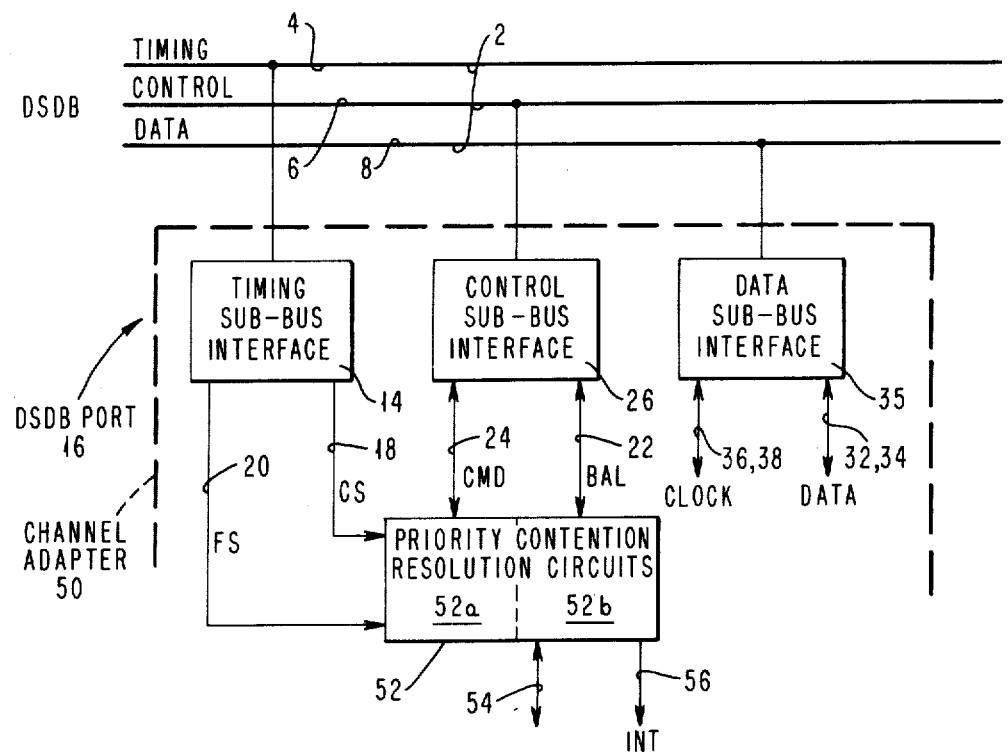

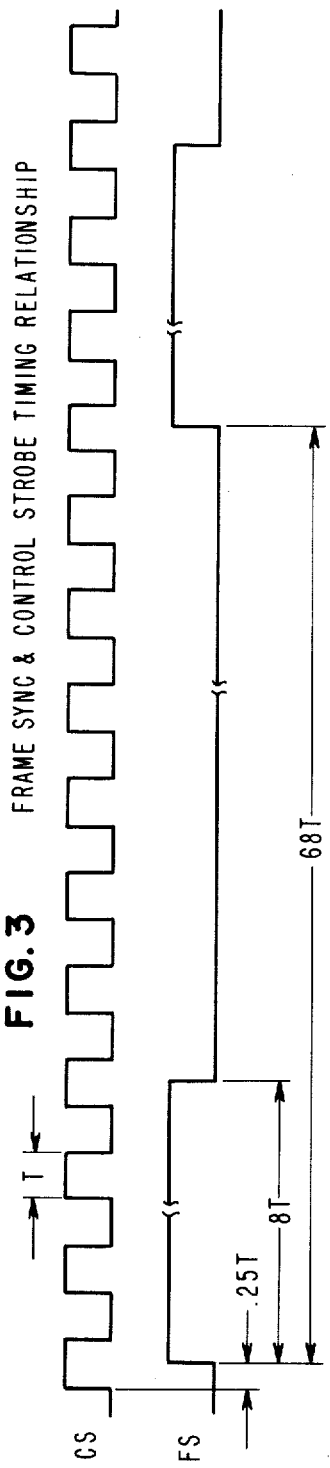
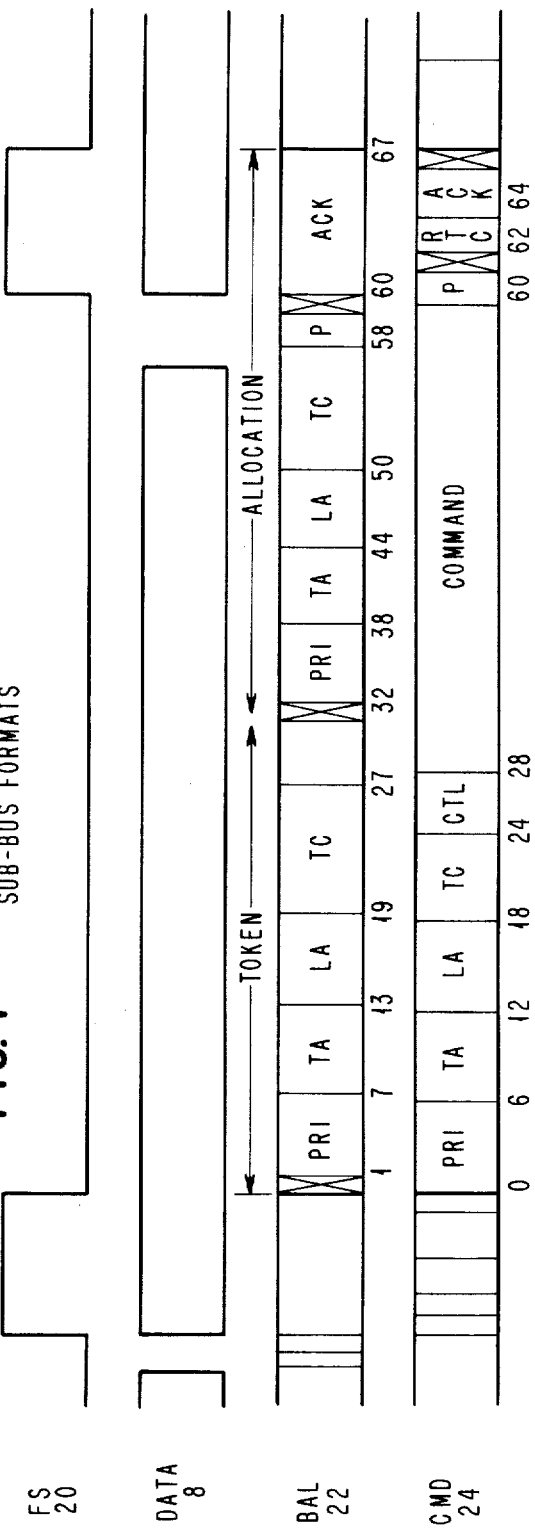

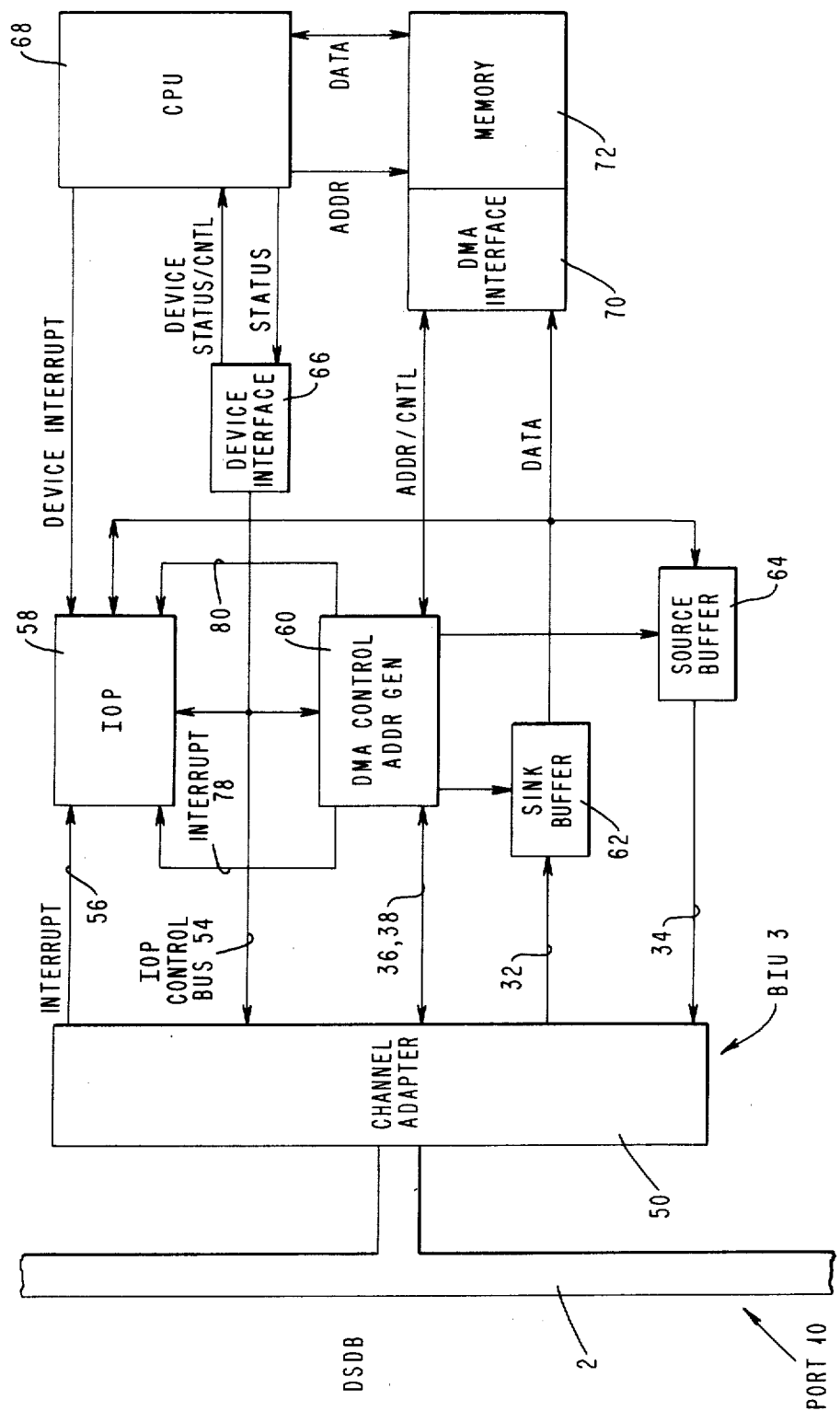

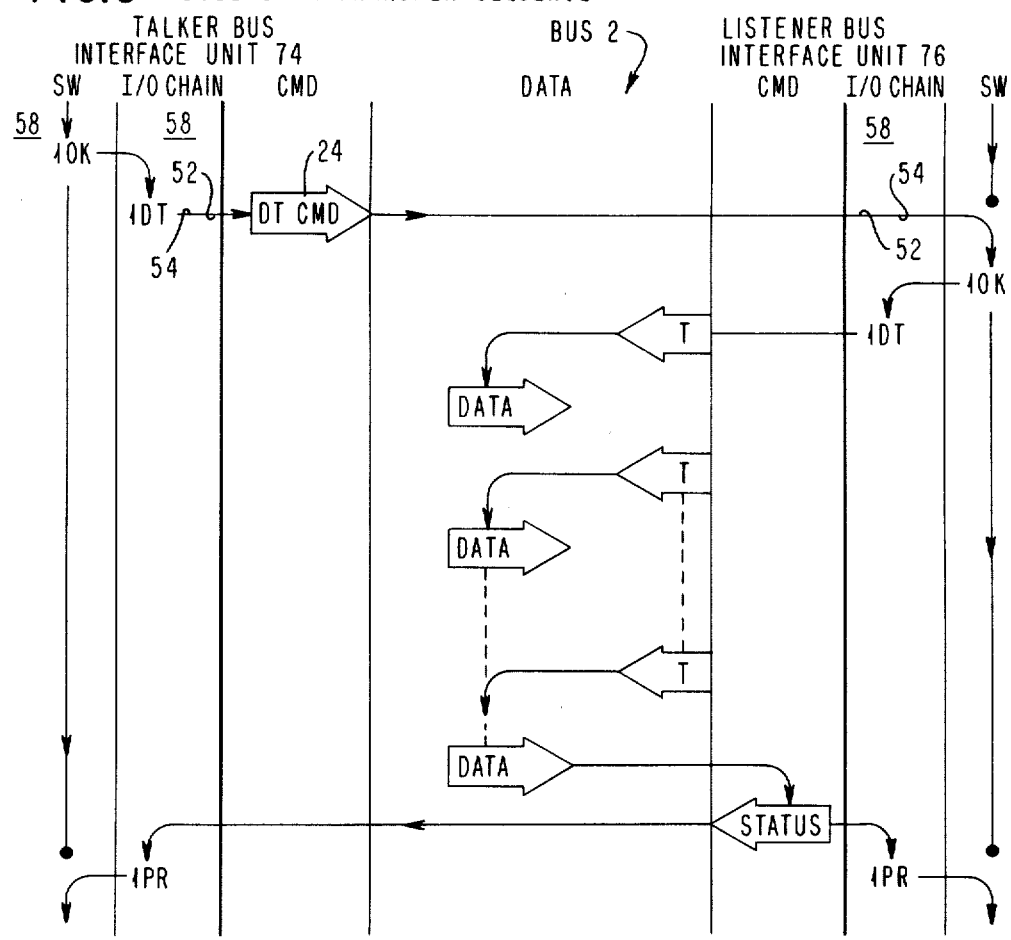
FIG. 6  DSDB DATA TRANSFER SEQUENCE
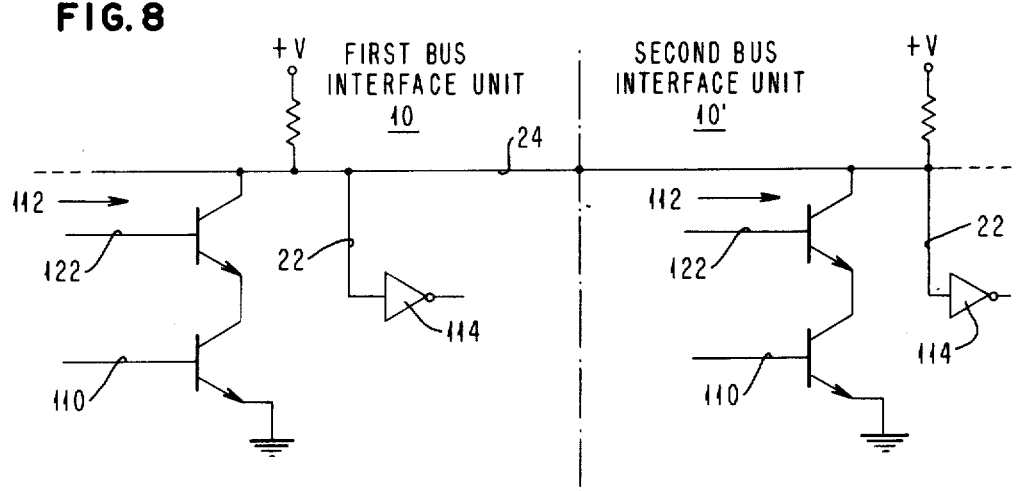
FIG. 8

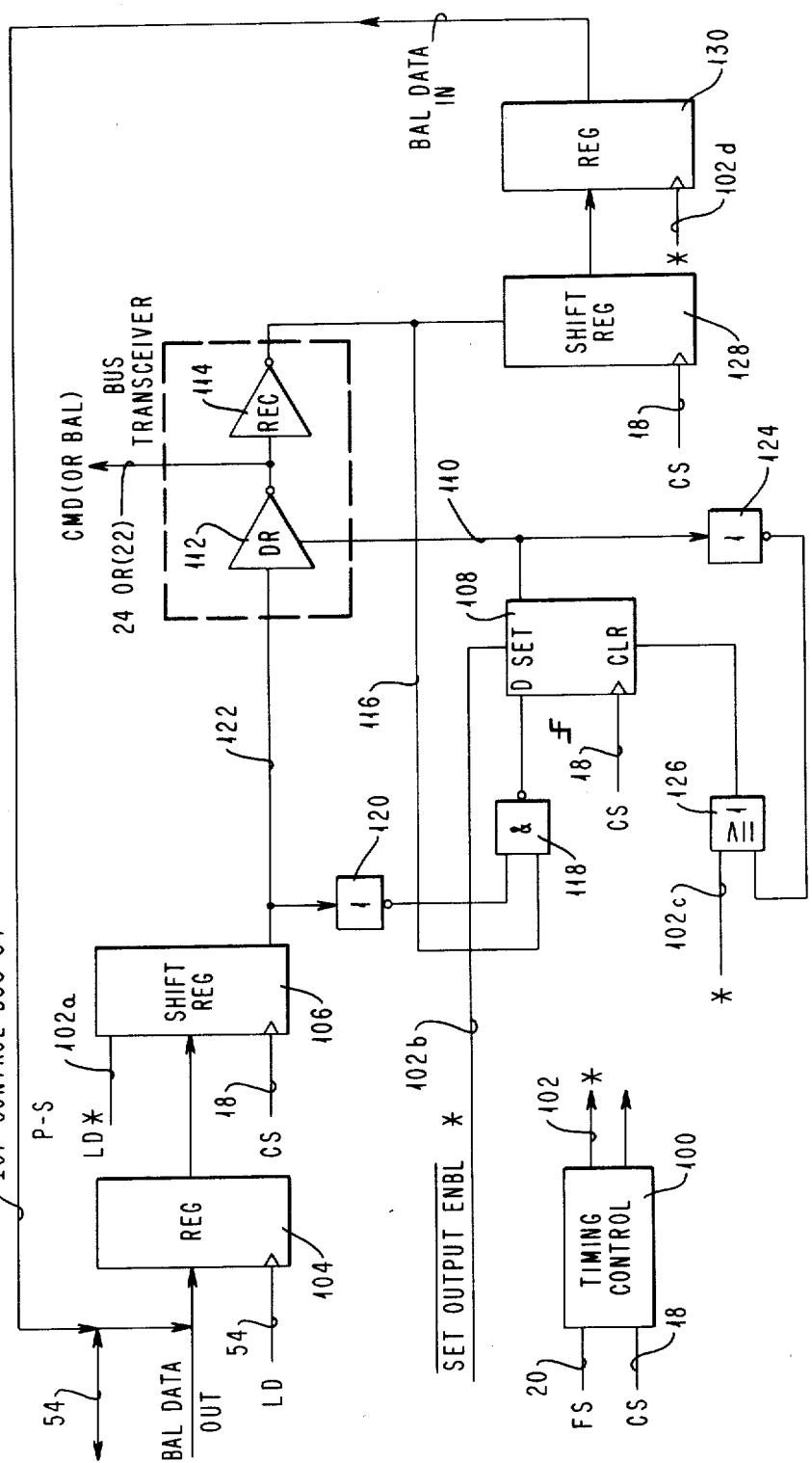

BUS INTERFACE UNITS SHARING A COMMON BUS USING DISTRIBUTED CONTROL FOR ALLOCATION OF THE BUS

FIELD OF THE INVENTION

The invention disclosed broadly relates to data processing technology and more particularly relates to multiprocessing architectures with common bus interconnections.

BACKGROUND OF THE INVENTION

The conventional approach to solving the data communications problems associated with multiprocessor architectures in data processing systems has resulted in a direct dedicated connection architecture to provide paths among all the processors needing to communicate data or control messages. This approach has a number of disadvantages including the need to have as many input/output channels as there are other processors in the expanded multiprocessing system. Thus, the cost of an additional processor must include the cost of the paths to the other processors as well. The net effect is to multiply the cost, bulk, weight and complexity of the effective multiprocessing system whenever an additional processing unit is added to increase the functional performance or capacity.

A related problem of prior art distributed data processing architectures is that they require some form of centralized control. Frequently, a centralized monitoring station is required for address transmission in a quasi-polling operation or alternately, a centralized channel for broadcasting sample priority values to all distributed processing nodes is required. Such centralized control mechanisms limit the flexibility in modifying the number of distributed processing elements connected into the system.

OBJECTS OF THE INVENTION

It is therefore an object of the invention to provide an improved distributed processing architecture for a multiprocessing system.

It is another object of the invention to provide an improved technique for coordinating the allocation of access of distributed processing elements to a commonly shared communication medium.

SUMMARY OF THE INVENTION

These and other objects, features and advantages of the invention are accomplished by the distributed system data bus disclosed herein. The distributed data processing system disclosed has a truly distributed control characteristic. A plurality of bus interface units (BIU) are interconnected by the distributed system data bus (DSDB) which includes a clock line, a serial command line (CMD), a serial bus allocation line (BAL) and a two byte wide data bus. A central clock connected to the clock line which defines the message frame timing, is the only centralized "control" element in the system. Each BIU may in turn be connected to either one or several data processing units, an I/O port, or a bridge connecting to still another similar bus network.

By prior arrangement, several BIUs will establish a set of relative priorities, commands and corresponding data transfer operations. The BIUs share the DSDB in a time division multiple access mode which requires them to agree to a time divided allocation of the common bus based upon their distributed assessment of the relative priorities of their pending messages. When a processor serviced by a first (talker) BIU wants to transmit data over the DSDB to a processor serviced by a second (listener) BIU, a three stage priority contention resolution operation takes place to obtain an exclusive allocation of the DSDB for the desired data transmission.

In the first stage, the talker BIU must contend with several other BIUs for access to the CMD line by sequentially transmitting a priority value on the CMD line consisting of a multibit binary number (high order bit first) in a synchronous manner with similar transmissions by the other contending BIUs. Each BIU has a first priority contention resolution circuit connected to the CMD line for cyclically monitoring each sequential binary bit state of the CMD line and comparing it with the corresponding BIU priority bit value and permitting the transmission of the present BIU priority bit on the CMD line only if it is greater than or equal in value to the binary value represented by the state of the CMD line. Otherwise, the priority contention resolution circuit immediately relinquishes the contention by the BIU for the allocation of the present message frame on the CMD line. When the talker BIU successfully wins the contention for allocation of the CMD line during a message frame, it transfers a command and a transaction code along with a destination address to the listener BIU. The listener BIU then interprets the received command and allocates the necessary storage for the message type designated by the command. The transaction code enables the two BIUs to distinguish between several messages of the same type.

In the second stage, the listener BIU must contend with several other BIUs for access to the bus allocation line (BAL) in order to send a token message to the talker BIU indicating its readiness to receive the message. This is done by the listener BIU sequentially transmitting a priority value on the BAL line consisting of a multibit binary number (high order bit first) in a synchronous manner with similar transmissions by other contending BIUs in an operation similar to that for the contention for the CMD line. Each BIU has a second priority contention resolution circuit connected to the BAL line for carrying out the contention operation for the BAL line in a manner similar to the operation of the first circuit. When the listener BIU successfully wins the contention for allocation of the BAL line during a message frame, it transfers a token message along with a destination address and the transaction code on the BAL line to the talker BIU. The talker BIU then interprets the received transaction code and commences the third stage.

In the third stage, the talker BIU must contend with several other BIUs for access to the bus allocation line (BAL) and the data bus, in order to send an allocation message to the listener BIU indicating that the next message frame on the data bus contains the data corresponding to the transaction code. This is done by the talker BIU sequentially transmitting a priority value on the BAL line consisting of a multibit binary number (high order bit first) in a synchronous manner with similar transmissions by other contending BIUs in a field in the message frame on the BAL line different from the field for the token message. This operation of data bus allocation contention is performed by the second priority contention resolution mechanism which is connected to the BAL line, in the same manner as that for the token message contention operation. When the talker BIU successfully wins the contention for allocation of the BAL line's data bus allocation field, it transfers the transaction code and destination address on the BAL line in the allocation field to the listener BIU. The listener BIU then interprets the received transaction code and correlates it with the data message which the talker BIU transmits to it over the data bus in the next message frame.

The resultant DSDB system achieves a high speed data transfer operation of great flexibility enabling the rapid transfer of a large variety of message types over various combinations of multiprocessor interconnections.

The completely distributed nature of control for allocation of the bus and resolution of contention for the bus permits complete flexibility in reconfiguring the bus and interconnecting it with other similar buses in a multibus network.

DESCRIPTION OF THE FIGURES

These and other objects, features and advantages of the invention will be more fully appreciated with reference to the accompanying figures.

FIG. 1 is a functional block diagram of the distributed system data bus configuration.

FIG. 2 is a more detailed functional block diagram of the sub-bus interfaces for the distributed system data bus.

FIG. 3 is a timing diagram illustrating the frame sync and control strobe timing relationship.

FIG. 4 is a format diagram of the sub-buses for the distributed system data bus.

FIG. 5 is a functional block diagram of a bus interface unit (BIU).

FIG. 6 illustrates a data transfer sequence for the distributed system data bus.

FIG. 7 is a logic diagram of the priority contention resolution circuit.

FIG. 8 is a circuit diagram of the transmission driver 112 connected to the bus line 24.

DISCUSSION OF THE PREFERRED EMBODIMENT

Distributed System Data Bus

The distributed system data bus (DSDB) is a general purpose, burst mode communications interface design to interconnect the processing, control and input/output portions of a distributed processing system. The DSDB allows the implementation of hierarchical networks in which many DSDB connected systems can be interconnected allowing communication between any pair of bus users, regardless of their network location.

The DSDB includes independent, non-interfering paths for control and data. This allows command protocol exchange, bus arbitration and data transfer activity to overlap, eliminating the data bandwidth degradation that would result from a shared interface. All DSDB control functions are fully distributed to the bus users requiring no centralized controller.

The DSDB architecture features fully programmable port addressing, multiple level, decentralized, priority allocation mechanism, concurrent multiple access capability and automatic error retry. The multiple level priority allocation system facilitates the use of deadline scheduling techniques to dynamically assign a priority to each packet of a multiple packet message. This technique allows a very high percentage of the bus bandwidth to be utilized for data traffic without creating overrun conditions. The DSDB is a direct shared bus oriented architecture intended for compatible implementation using a wide variety of physical interface types.

The DSDB consists of three sub-buses as shown in FIG. 1 including timing sub-bus 4, control sub-bus 6, and data sub-bus 8.

The timing sub-bus 4 is unidirectional and is driven by a central bus timing generator 12. All other control functions for the bus are distributed to the bus users 10. The DSDB incorporates a distributed priority contention resolution mechanism which requires no centralized control function whatsoever. As a result, any DSDB port 16 can be taken off line (or fail) without affecting normal DSDB operation.

TIMING SUB-BUS 4

The timing sub-bus 4 is used to distribute the basic synchronization signals used by the DSDB ports 16. The timing sub-bus interface 14 is shown in block form in FIG. 2. Two basic bus timing signals are distributed by the timing sub-bus, control strobe (CS) 18 and frame sync (FS) 20. Control strobe 18 defines the data slots on the control sub-bus 6 and FS 20 defines the beginning of data frames and control cycles. Frame sync 20 is synchronous with CS 18, and is active for eight CS cycles and inactive for 60 CS cycles, for example. The timing relationship between CS and FS is shown in FIG. 3.

CONTROL SUB-BUS 6

The control sub-bus 6 performs three basic control functions for the DSDB;

1. Distribute command and status information to the DSDB ports 16,
2. Perform contention resolution and bus allocation functions and provide the to/from addressing for the data sub-bus 8, and
3. Provide a data transfer token exchange mechanism between the participants of a message transfer.

The control sub-bus 6, as shown in FIG. 4 consists of two independent signal lines, the bus allocation line (BAL) 22 and the command line (CMD) 24. These two lines are divided into 68 time slots defined by the rise of CS 18. The CMD 24 and BAL 22 interface with the DSDB 2 through interface circuits 26 that permit a dot "OR" function to be performed on the bus 6. This allows the use of fully distributed contention resolution process as described below. The interface circuits 26 used may employ either open collector, signal ended techniques or balanced differential techniques where the driver is placed in a high impedance state when a logic 0 is transmitted. In either case, a terminator is required to bias the transmission line at a logic 0 allowing any port to create the logic 1 condition on the bus.

An example of an NPN transistor open collector circuit for the driver 112 is shown in FIG. 8 where drivers for a first BIU 10 and a second BIU 10' are shown with their collectors respectively connected to the CMD line 24. A positive signal on both lines 110 and 122 for any BIU will place the CMD line at ground potential for a logic 1 state. If either the line 110 or the line 122 is not positive for all BIUs, then the CMD line will be at +V potential for a logic 0 state.

COMMAND LINE 24

The command line (CMD) 24 is a single line bus and is used to distribute command and status information throughout the DSDB 2. The command line 24 is divided into 68 time slots, as shown in FIG. 4 with the following field definitions.

1. PRI (0–5)—Priority field specifies the relative priority of the current message.
2. TA (6–11)—Talk address field contains the address of the DSDB port 16 sending the data onto the CMD line 24.
3. LA (12–17)—Listen address indicates address of DSDB port 16 to which CMD data is being sent.
4. TC (18–23)—Transaction code identifies the particular data message to be sent.
5. CNTL (24–27)—Control field is used to identify the type of data present in the command field.
6. COMMAND (28–59)—The command field contains the control information being sent to the listener.
7. P (bit 60)—Parity bit represents odd parity over bits 0–59 of CMD.
8. Unused (61)
9. RTC (bits 62–63) The real time clock (RTC) portion of the CMD line is used to distribute a common time base to all DSDB interface equipment 26. The DSDB RTC is a 32 bit up counter located at each DSDB port 16, which is incremented every 32 cycles and is generated at the central timing generator 12. The first CMD RTC bit is used to serially send one bit of the RTC during each DSDB cycle of 32 consecutive cycles. When the last bit is being sent, the second RTC bit (bit 63) is activated as an RTC sync. An additional five low order bits is added by the bus interface unit (BIU) to the bottom of the RTC by counting FS pulses. (These low order bits are synchronized by setting them to all ones when the RTC sync is present.) Each DSDB port 16 receives the RTC and uses it to synchronize its operation with the rest of the system.
10. ACK (64–66)—The CMD acknowledge is the response of the receiving port (LA) upon receiving the command. The individual bits in the ACK field are defined as follows:

| o | Bit 64 - BUSY - The addressed port (LA) cannot currently receive commands. |
| o | Bit 65 - PE - The receiving port (LA) detected even parity on bits 0–59. |
| o | Bit 66 - ACK - The preceding CMD data was received without error by the addressed port (LA). |

Unused (67)

BUS ALLOCATION LINE 22

The bus allocation line (BAL) 22 is a bit serial control line used to
1. Return data transfer token (DTT);
2. Perform priority contention resolution function for potential data sub-bus users;
3. Carry source and destination addressing and message identification information for next data frame; and
4. Return data transmission acknowledgement for previous data frame.

The BAL is a time slotted bus with each of the 68 time slots, defined by a period of CS, having a predefined interpretation as shown in FIG. 4.

The BAL 22 is functionally divided into two parts. The first part, the data transfer token (DTT) portion, is used to transfer tokens from receiving DSDB ports to sending ports authorizing the sender to transfer a single unit of data. The DTT portion includes bits 0 through 30 of the BAL and is divided into the following fields:

1. Unused (0)
2. PRI (1–6)—The priority field indicates the relative priority of the current token.
3. TA (7–12)—Talk address contains the address of the port which is to send data.
4. LA (13–18)—Listen address contains the address of the port authorizing transmittal of data, i.e. the port sending the token.
5. TC (19–26)—Transaction code is used to identify the message for which data transmittal is authorized.
6. Unused (27–30)

The second part of the BAL 22 is the allocation portion which is used to resolve contention for and provide addressing for the data sub-bus 8. The allocation portion is divided into the following fields:

1. Unused (31)
2. PRI (32–37)—The priority field indicates the relative priority of the current BAL access.
3. TA (38–43)—Talk address contains the address of the port that will send data on the following data packet.
4. LA (44–49)—Listen address contains the address of the port to which the following data packet is directed.
5. TC (50–57)—Transaction code is used to identify the message of which the following data packet is a part.
6. P (58)—Parity represents odd parity for the BAL data from bits 32 through 57.
7. Unused (59)
8. ACK (60–67)—The acknowledge field is used by the receiver of the previous data packet to indicate the status of that transfer and by the sender of the next data frame to indicate termination of the message. The individual bits of the ACK field are defined as follows:

|   | Bit | Function |
|---|-----|----------|
| o | 60  | Reserved |
| o | 61  | Reserved |
| o | 62  | ACK - The data for received normally |
| o | 63  | DWE - Indication from the sender that current data frame is the last for this message - sender termination. |
| o | 64  | Reserved |
| o | 65  | Reserved |
| o | 66  | SEQE - Sequence error detected by the sender or receiver - message terminated |
| o | 67  | RED - Repeat data, parity error detected by receiving port |

Contention resolution is performed twice in each BAL cycle. During the DTT portion, contention is resolved over the PRI, TA and LA fields (bits 1–18). During the allocation portion, contention is resolved over the PRI and TA fields only (bits 32–43). In each case, the TA refers to the port sending the message and the LA refers to the port receiving the message. For a given message, the addressing information (PRI, TA, LA and TC) in the DTT field is the same as that sent in the allocation field of the corresponding data packet transmission.

DSDB CONTENTION RESOLUTION PROCESS

The serial contention resolution function incorporated into the BAL 22 and CMD lines 24 provides a distributed technique for resolving multiple bus user contention in a single serial operation. The contention resolution period includes only the time when the TA and PRI fields are being output on the allocation portion of the BAL 22 and CMD line 24 and when the PRI, TA and LA is being output on the DTT portion of the BAL 22. When the contention period begins, each potential bus user gates the most significant bit of its priority code onto the line. All users are connected to the line in such a manner that the bus performs an implied OR function such that any port can activate the logic 1 condition. At the end of the first clock period, each contending unit compares the data on the line with data it outgated. If its data was a 0 and the bus contained at 0, or if it outgated at 1, then it proceeds to gate out its next most significant priority bit in the following time slot. If however it outgated a 0, but the bus was at 1, then it has lost contention and ceases to outgate. This process continues through the remainder of the priority field eliminating all contenders except those with the highest priority. The contention resolution process then proceeds through the TA or LA field to select a single bus user. The winning contender then serially outputs a remaining LA, TC and parity information for the current frame.

DATA SUB-BUS 8

The data sub-bus 8 is a synchronous, bidirectional 16 bit data interface consisting of the following lines:

1. Data Out 32—Used to transmit data from the port onto the bus.
2. Data In 34—Used to transmit data from the bus to the port.
3. Data Strobe Out (DSO) 36—Clock used to gate data onto the bus.
4. Data Strobe In (DSI) 38—Clock received from bus used to gate data into the port.

The data sub-bus 8 operates in a synchronous, burst mode in which the sender selected by the contention resolution on the immediately preceding BAL allocation cycle, outputs a burst of 256 words onto the bus 8 along with a data strobe used by the listener to receive the data. The sender outgates each word on the fall (logic 1 to logic 0 transition) of DS and the receiver clocks the data in on the rise (logic 0 to logic 1 transition) of DS.

The port (talker) which has won contention for use of the data sub-bus will be transferring data after the rise of FS. Prior to actually sending data however, the talker must quiesce the DS line to insure proper transfer of control from the previous talker. To do this, the talker enables its DS interface driver to the logic 1 level immediately following the rise of the CS pulse two cycles prior to the beginning of FS and holds it at a steady 1 level until after the use of FS. After FS, the port then toggles DS the required number of times to transfer the 256 data words.

After all data (and error control information, if required) is transferred, the DS line is again quiesced at a logic 1 level. The DS interface is again disabled two CS cycles prior to the next rise of FS. This technique minimizes unnecessary and extraneous transitions on the DS line and insures proper data transfer.

BUS INTERFACE UNIT 3

FIG. 5 is an overall block diagram of the bus interface unit (BIU) 3 for the port 10. As can be seen in the figure, the channel adapter 50 which is shown in greater detail in FIG. 2, has the clock lines 36 and 38, the data lines 32 and 34, the IOP control bus line 54 and the interrupt line 56 connected to it. The IO processor (IOP) 58 is connected by means of the interrupt line 56 and the IOP control bus line 54 to the channel adapter 50. The DMA control generator 60 is connected by means of the interrupt line 78 and control line 80 and IOP control bus 54 to the IOP 58 and has an output connected to the sink buffer 62 and to the source buffer 64. The sink buffer 62 has an input connected to the data sub-bus interface 35 over line 32 and the source buffer 64 has an output line 34 connected to the data sub-bus interface 35. The IOP control bus 54 is also connected to the device interface 66 which in turn is connected to the CPU 68 which is being serviced by the BIU 3 at the port 10. The CPU 68 has an associated memory 72 and the data which is transferred from the sink buffer 62 or transferred to the source buffer 64 passes through the direct memory access (DMA) interface 70 connected to the memory 72, as is shown in FIG. 5.

FIG. 6 illustrates the distributed system data bus data transfer sequence to carry out a communication between a talker bus interface unit 74 and a listener bus interface unit 76 over the distributed system data bus 2. As an illustration of a particular data transfer sequence, assume that the CPU 68 at the talker bus interface unit 74 has, by prearrangement, established a particular category of data transfer with the CPU 68 at the listener bus interface unit 76. This data transfer may be a component operation in a larger shared task between the CPUs 68 at the respective ports 10. Assume that a particular category of data transfer requires the transmission of three data packets of 256 16-bit words from the talker bus interface unit 74 to the listener bus interface unit 76. The IO processor 58 at the talker bus interface unit 74 generates an instruction to its hardware components to initiate a data transfer of this category. The IO processor 58 then generates a data transfer command over the IOP control bus 54 to the priority contention resolution circuit 52, shown in FIGS. 2 and 7. The priority contention resolution circuit 52 serializes the data transfer command and outputs it on line 24 of the command bus through the channel adapter 50 to the distributed system data bus 2. As may be seen from the DSDB data transfer sequence diagram of FIG. 6, the data transfer command is transmitted over the command line 24 to the listener bus interface unit 76 where it is input to the priority contention resolution circuit 52 and output over the line 54 to the IO processor 58 in the BIU 76. The IOP 58 interprets the data transfer command received over the command line 24 and sets up its hardware to transfer three sequential data transfer tokens over the bus allocation line 22, each of which will initiate the transfer of a respective 256 word data packet from the talker bus interface unit 74.

It should be realized that this communication of the command between the talker bus interface unit 74 and the listener bus interface unit 76 is occurring in a highly competitive environment where at least 62 other bus interface units connected to the command line 24 of the distributed system data bus 2 are competing for time divided slots on the bus 2. Thus the transmission of the data transfer command over the line 24 from the BIU 74 to the BIU 76 must be established through the priority contention resolution operation which was described above.

The transmission of the data transfer token from the listener bus interface unit 76 over the bus allocation line 22 to the talker must also take place in competition with the attempted transmissions from other bus interface units, through the priority contention resolution operation. If the priority contention resolution operation for the listener bus interface unit 76 is successful in competing for access to the token portion of the bus allocation line 22, the format of which is illustrated in FIG. 4, the talker bus interface unit 74 receives the token on the BAL line 22 in the priority contention resolution circuit 52 and transfers the token over the IOP control bus 54 to the IOP 58. The IOP 58 in the BIU 74 interprets the token and if the token is directed to the BIU 74, the IOP 58 initiates the output of the allocation portion of the bus allocation line 22, as is illustrated in FIG. 4. The allocation portion then undergoes a priority contention resolution operation in contending for the field from bits 32 through 67 of the BAL 22 as has been described above.

The IOP 58 in the talker bus interface unit 74 outputs the allocation portion field 32 through 67 onto the bus allocation line 22 via the IOP control bus 54 and the priority contention resolution circuit 52. The allocation field is transmitted over the BAL line 22 to the listener bus interface unit 76 where it is received by the priority contention resolution circuit 52 in the channel adapter 50 of the BIU 76. This sets up the IOP 58 to expect the receipt of 256 words of data from the talker bus interface unit 74 during the next data frame, which is to be loaded into the sync buffer 62 via the data line 32.

The operation of the listener transmitting a data transfer token by the priority contention resolution mechanism and of the talker then transmitting an allocation field and the corresponding 256 words of data from the talker bus interface unit 74, is repeated three times until the full complement of three packets of 256 words each is transferred from the talker bus interface unit 74 to the listener bus interface unit 76.

As is seen in the format diagram for the BAL line 22 in FIG. 4, when the data packet on the data line 8 is received at the listener bus interface unit 76, an acknowledge signal is returned in the field bits 60 through 67 of the BAL line 22, which is transmitted during the next frame from the listener BIU unit 76 to the talker BIU unit 74.

With the completion of the reception of the full complement of data, the IO processor 58 in the listener bus interface unit 76 recognizes that the prearranged number of data packets has been successfully received and therefore transmits over the command line 24 a status message to the talker bus interface unit 74 signifying that this IO sequence is terminated.

FIG. 7 is a detailed logic diagram of the priority contention resolution circuits 52, showing the mechanism which carries out the priority contention resolution operation described above. The priority contention resolution circuit 52 shown in FIG. 2 employs two circuits 52A and 52B as shown in FIG. 7, the first 52B having an input/output line 22 which is the bus allocation logic (BAL) line and the second circuit 52A being connected to the command (CMD) line 24. For simplicity, only a single circuit will be shown and described. However, both circuits operate in a similar manner, one servicing the BAL line and the other servicing the CMD line. Since circuits 52 also carry out a serialization and deserialization function, they will also be referred to herein as the serializer/deserializer 52.

As was described above, priority contention resolution is carried out for three different stages in the operation of transferring information from a first BIU to a second BIU, namely in the initial transfer of the command from the talker BIU to the listener BIU over the command line CMD 24; next on the BAL line 22, the listener transfers the token to the talker BIU, and lastly during the data allocation stage when the talker BIU contends for the allocation of the data bus 8 for the transfer of the desired 256 word packet of data to the listener BIU. The following description will refer to the priority contention resolution operation for the transfer of a command over the CMD line. However, a similar operation will occur for the transfer of the token from the listener to the talker and for the contention of allocation of the data bus by the talker in transferring data to the listener.

Continuing with the previous example where the talker bus interface unit 74 in FIG. 6 transferred a command word over the command line 24 to the listener bus interface unit 76, the following values can be postulated for the talker BIU 74 and the listener BIU 76. The talker BIU and the listener BIU can both have a priority value PRI of 32 which is a binary 100000. The talk address TA for the talker BIU 74 can have a value of 16 or a binary number of 010000 and the listener BIU 76 can have an address value of 8 which is a binary number 001000. The transaction code TC is irrelevant as far as a command transfer is concerned. The control field CTL designates the type of command in the command field from bits 28 through 59 and can have a value of 001, for example. The command field which is a 32 bit field, can be designated by an all zeros' contents, for example.

Just prior to the commencement of the present bus frame, the register 104 shown in FIG. 7 is loaded over the IOP control bus 54 from the IOP 58 in FIG. 5 with the command field bits 0 through 60 as were designated in the previous paragraph. The timing control 100 receives the timing pulses CS on line 18 and FS on line 20 and generates the sequence of timing pulses on the cable 102 which are delivered to the various portions of the circuit in FIG. 7 at 102A through 102D. The first timing signal 102A from the timing control 100 is input to the shift register 106 to receive from the register 104 the entire 60 bit field of the command shown in FIG. 4. As each clock time on the CS line 18 occurs, a parallel to serial conversion takes place outputting in a sequential manner one bit from the command field, starting at the zero position with the high order value of the priority code PRI. As was discussed above, the value for a PRI is 100000, and therefore a binary 1 is output from the shift register on line 122 and passes to the line driver 112 which is an open collector driver as was discussed above. The quiescent or binary 0 value for the bus line is a positive voltage and a one value input on the driver 112 will cause the grounding of the bus line. In this illustration, the binary 1 value output from the shift register 106 and input to the driver 112 will cause the grounding of the CMD line 24.

It is to be recalled that as many as 62 other BIUs can be contending at the same time for the transmission of the command message on the command line 24. Therefore, the receiver 114 which detects whether the CMD line 24 is the positive value corresponding to a binary 0 or the ground level corresponding to a binary 1, performs an inversion and transfer the bus's voltage state as a low level corresponding to a binary 0 or a positive level corresponding to a binary 1 to the other input of the NAND gate 118. If both inputs to the NAND gate are not positive, indicating that both the output from the shift register 106 and the binary value of the CMD line 24 are the same, either both one or both zero, then a positive signal will be output from the NAND gate 118 to the D input of the flip-flop 108.

As long as the flip-flop 108 is in its set state, which was set by the set output enable signal 102B from the timing control 100 prior to the beginning of the frame, an enabling signal will be output on the line 110 to the driver 112 so that signals input to the driver on line 122 will be output to the bus 22.

As long as the binary values for the priority value PRI output by the shift register 106 are equal to or greater than the corresponding binary value on the BAL bus line 22, the flip-flop 108 will remain in its set state, the driver 112 will remain in its enable condition, and the PRI bits will continue to be output on the CMD line 24. If however, during this contention for the CMD bus 24, another BIU unit had a higher priority so that the binary value of the bit output from the shift register 106 was less than the corresponding binary state of the CMD line 24, then a binary 0 will be present on the line 122 which will result in a positive signal to one input of the NAND gate 118 whereas a binary 1 value will be present on the line 116 which is the other input to the gate 118, resulting in a negative output signal being applied to the D input of the flip-flop 108. This will result in a negative signal on the line 110 which disables the driver 112 for the balance of this frame and a one value output from the inverter 124 which is passed through the OR gate 126 to the clear/reset terminal of the flip-flop 108, preventing any further enablement of the driver 112 until the next set output enable signal on line 102B at the start of the next frame. In this manner, a local BIU will relinquish its contention for the bus whenever it has a priority value bit which has a lesser value than the corresponding bit on the BAL line 22.

With respect to the present example, both the talker BIU 74 and the listener BIU 76 have the same priority value and therefore both will survive the transmission of the first six bits in the PRI field. However, the tie breaking will take place in the next talk address TA field where the talker BIU 74 has a higher address value of 16 than the listener BIU 76 which has a value of 8. Thus the talker BIU 74 will have been allocated the use of the CMD line 24 during this frame. At this point the shaft register 106, under control of the timing control 100, outputs the balance of the transaction code field TC, the control field CTL, and the command field onto the command line 24. The listen address field LA portion of the transmission will identify the listener BIU 76 which is to accept and process the command designated in the command field transmitted by the talker BIU 74.

At the listener BIU 76, which has a serializer/deserializer circuit 52 identical to that shown in FIG. 7, the shift register 128 receives from the receiver 114 connected to the CMD line 24, all of the data bits in the field for the command shown in FIG. 4 on the command line 24. Under the control of the timing control 100 via the timing line 102D, the register 130 receives the deserialized command and transfers it over the IOP control bus 54 to the IOP 58 for processing.

Thus it is seen that the autonomous allocation of the command line CMD 24 or the bus allocation line BAL 22 can be achieved in a very rapid manner by the immediate relinquishment of contention for allocation carried out by the serializer/deserializer circuit 52 shown in FIG. 7.

As was discussed above, after the command received at the listener BIU 76 has been processed, the listener BIU 76 will engage in a priority contention resolution operation similar to that described above, in order to transfer its token on the BAL line 22 to the talker bus interface unit 74. Still further, as was discussed above, the talker BIU 74 will engage in a priority contention resolution operation similar to that just described, in its contention for allocation of the data bus 8 for the next 256 word field in the data frame. The operation of the sequence of priority contention resolution for a command and then priority contention resolution for a token and then priority contention resolution for the allocation of the data bus results in achieving a much greater degree of flexibility for confirmed information transfers of a plurality of types of data sets between bus interface units than has been available in the prior art.

Although a specific embodiment of the invention has been disclosed, it will be understood by those of skill in the art that the foregoing and other changes in form and details may be made therein without departing from the spirit and the scope of the invention.

Having thus described our invention, what we claim as new, and desire to secure by Letters Patent is:

1. In a distributed data processing system including a plurality of bus interface units interconnected by a clock line which defines a periodic message frame, a serial bus allocation line and a data bus, an apparatus for the distributed allocation of the data bus to pending messages to be transmitted thereover in a time division multiple access mode, comprising:

a priority contention resolution circuit in a first bus interface unit having a talk address, including a transmission means having an output connected to said allocation line, said transmission means having an output for sequentially transmitting during a first message frame, a priority value and said talk address thereover in the form of a multibit binary number with the high order bit of said priority value first, in a synchronous manner with transmissions of respective priority values and talk addresses by other bus interface units contending for use of said data bus;

a monitoring means in said circuit having an input connected to said allocation line, for cyclically monitoring each sequential binary bit state of said allocation line and comparing it with a corresponding bit value of said priority value and talk address of said first bus interface unit;

an inhibiting means in said circuit having an input connected to said monitoring means and an output connected to said transmission means, for inhibiting the transmission of a corresponding bit of said priority value and talk address, if its value is less than the value of said binary bit state of said allocation line;

said circuit transmitting an allocation message including a listen address during said first message frame over said allocation line to a second bus interface unit connected thereto having said listen address when said priority value and talk address is greater than said respective priority values and talk addresses of said other interface bus units, said allocation message identifying a data message to be sent by said first bus interface unit over said data bus to said second bus interface unit in the next message frame.

2. In a distributed data processing system including a plurality of bus interface units interconnected by a clock line which defines a periodic message frame, a serial bus allocation line and a data bus, an apparatus for the distributed allocation of the data bus to pending messages to be transmitted thereover in a time division multiple access mode, comprising:
- a priority contention resolution circuit in a first bus interface unit having a talk address, including a transmission means having an output connected to said allocation line, said transmission means having an output for sequentially transmitting during a first message frame, a priority value and said talk address thereover in the form of a multibit binary number with the high order bit of said priority value first, in a synchronous manner with transmissions of respective priority values and talk addresses by other bus interface units contending for use of said data bus;
- a monitoring means in said first circuit having an input connected to said allocation line, for cyclically monitoring each sequential binary bit state of said allocation line and comparing it with a corresponding bit value of said priority value and talk address of said first bus interface unit;
- an inhibiting means in said circuit having an input connected to said monitoring means and an output connected to said transmission means, for inhibiting the transmission of a corresponding bit of said priority value and talk address, if its value is less than the value of said binary bit state of said allocation line;
- said circuit transmitting an allocation message including a listen address during said first message frame over said allocation line to a second bus interface unit connected thereto having said listen address when said priority value and talk address is greater than said respective priority values and talk addresses of said other interface bus units, said allocation message identifying a data message to be sent by said first bus interface unit over said data bus to said second bus interface unit in the next message frame;
- a shift register for serially outputting bits of said priority value and talk address over an output line to said transmission means;
- a first inverter connected to said output line for inverting the polarity of said priority bits;
- a second inverter connected to said allocation line for inverting the polarity of said binary bit state of said allocation line;
- a NAND gate having a first input connected to said first inverter and a second input connected to said second inverter, for providing an enabling signal to said transmission means when the binary value of said priority and talk address bits is greater than or equal to the binary value of corresponding ones of said binary bit states of said allocation line.

3. The apparatus of claim 2, wherein said transmission means further comprises:
- a first bipolar transistor having its collector connected to said allocation line and through a resistive impedance to a first potential, a base connected to a source of said priority value signal, and an emitter connected to a second potential.

4. The apparatus of claim 3, wherein said inhibiting means further comprises:
- a second bipolar transistor having its collector-emitter path connected between said emitter of said first transistor and said second potential, with its base connected to the output of said NAND gate, for preventing said second potential from being applied to said allocation line when the binary bit value of one of said priority bits is less than the binary value of a corresponding one of said binary bit status of said allocation line.

5. In a distributed data processing system including a plurality of bus interface units interconnected by a clock line which defines a periodic message frame, a serial command line, a serial bus allocation line and a data bus, an apparatus for the distributed allocation of the data bus to pending messages to be transmitted thereover in a time division multiple access mode, comprising:
- a first priority contention resolution circuit in a first bus interface unit having a talk address, including a transmission means having an output connected to said command line said transmission means sequentially transmitting during a first message frame, a first priority value and said talk address over said command line in the form of a multibit binary number with the high order bit first, in a synchronous manner with transmissions of respective priority values and talk addresses by other bus interface units contending for use of said command line;
- a monitoring means in said first circuit having an input connected to said command line, for cyclically monitoring each sequential binary bit state of said command line and comparing it with the corresponding bit value of said priority value and talk address of said first bus interface unit;
- an inhibiting means in said first circuit having an input connected to said monitoring means and an output connected to said transmission means, for inhibiting the transmission of said corresponding bit of said priority value and talk address if its value is less than the value of said binary bit state of said command line;
- said first circuit transmitting a command including a listen address during said first message frame over said command line to a second bus interface unit connected thereto having said listen address when said first priority value and talk address is greater than said respective priority values and talk addresses of said other interface bus units, said command identifying a data message to be sent by said first bus interface unit over said data bus to said second bus interface unit.

6. In a distributed data processing system including a plurality of bus interface units interconnected by a clock line which defines a periodic message frame, a serial command line, a serial bus allocation line and a data bus, an apparatus for the distributed allocation of the data bus to pending messages to be transmitted thereover in a time division multiple access mode, comprising:
- a first priority contention resolution circuit in a first bus interface unit having a talk address, including a transmission means having an output connected to said command line said transmission means sequentially transmitting during a first message frame, a first priority value and said talk address over said command line in the form of a multibit binary number with the high order bit of said priority value first, in a synchronous manner with transmissions of respective priority values and talk addresses by other bus interface units contending for use of said command line;

a monitoring means in said first circuit having an input connected to said command line, for cyclically monitoring each sequential binary bit state of said command line and comparing it with a corresponding bit value of said priority value and talk address of said first bus interface unit;

an inhibiting means in said first circuit having an input connected to said monitoring means and an output connected to said transmission means, for inhibiting the transmission of a corresponding bit of said priority value and talk address, if its value is less than the value of said binary bit state of said command line;

said first circuit transmitting a command including a listen address during said first message frame over said command line to a second bus interface unit connected thereto having said listen address when said first priority value and talk address is greater than said respective priority values and talk addresses of said other bus interface units, said command identifying a data message to be sent by said first bus interface unit over said data bus to said second bus interface unit;

a shift register for serially outputting bits of said priority value and talk address over an output line to said transmission means;

a first inverter connected to said output line for inverting the polarity of said priority bits;

a second inverter connected to said allocation line for inverting the polarity of said binary bit state of said allocation line;

a NAND gate having a first input connected to said first inverter and a second input connected to said second inverter, for providing an enabling signal to said transmission means when the binary value of said priority and talk address bits is greater than or equal to the binary value of corresponding ones of said binary bit states of said allocation line.

7. The apparatus of claim 6, wherein said transmission means further comprises:

a first bipolar transistor having its collector connected to said allocation line and through a resistive impedance to a first potential, a base connected to a source of said priority value signal, and an emitter connected to a second potential.

8. The apparatus of claim 7, wherein said inhibiting means further comprises:

a second bipolar transistor having its collector-emitter path connected between said emitter of said first transistor and said second potential, with its base connected to the output of said NAND gate, for preventing said second potential from being applied to said allocation line when the binary bit value of one of said priority bits is less than the binary value of a corresponding one of said binary bit status of said allocation line.

9. In a distributed data processing system including a plurality of bus interface units interconnected by a clock line which defines a periodic message frame, a serial command line, a serial bus allocation line and a data bus, an apparatus for the distributed allocation of the data bus to pending messages to be transmitted thereover in a time division multiple access mode, comprising:

a first priority contention resolution circuit in a first bus interface unit having a talk address, including a transmission means having an output connected to said command line said transmission means sequentially transmitting during a first message frame, a first priority value and said talk address over said command line in the form of a multibit binary number with the high order bit of said priority value first, in a synchronous manner with transmissions of respective priority values and talk addresses by other bus interface units contending for use of said command line;

a monitoring means in said first circuit having an input connected to said command line, for cyclically monitoring each sequential binary bit state of said command line and comparing it with a corresponding bit value of said priority value and talk address of said first bus interface unit;

an inhibiting means in said first circuit having an input connected to said monitoring means and an output connected to said transmission means, for inhibiting the transmission of said corresponding bit of said priority value and talk address, if its value is less than the value of said binary bit state of said command line;

said first circuit transmitting a command including a listen address during said first message frame over said command line to a second bus interface unit connected thereto having said listen address when said first priority value and talk address is greater than said respective priority values and talk addresses of said other bus interface units, said command identifying a data message to be sent by said first bus interface unit over said data bus to said second bus interface unit;

a second priority contention resolution circuit in a second bus interface unit intended to receive said data message from said first bus interface unit, including a transmission means having an output connected to said bus allocation line, for sequentially transmitting during a first portion of a second message frame in response to the receipt of said command from said first bus interface unit, a second priority value over said bus allocation line in the form of a multibit binary number with its high order bit first, in a synchronous manner with transmissions of priority values by other bus interface units contending for use of said bus allocation line;

a monitoring means in said second circuit having an input connected to said bus allocation line, for cyclically monitoring each sequential binary bit state of said bus allocation line and comparing it with the corresponding priority bit value of said second bus interface unit;

an inhibiting means in said second circuit having an input connected to said second circuit's monitoring means and an output connected to said second circuit's transmission means, for inhibiting the transmission of said corresponding priority bit if its value is less than the value of said binary state of said bus allocation line;

said second circuit transmitting a token message during said second message frame over said bus allocation line to said first bus interface unit connected thereto, when said second priority value is greater than said priority values of said other bus interface units, said token message indicating that said second bus interface unit is ready to receive said identified data message over said data bus from said first bus interface unit.

10. The apparatus of claim 9, wherein said transmission means in said second circuit further comprises:
a first bipolar transistor having its collector connected to said allocation line and through a resistive impedance to a first potential, a base connected to a source of said second priority value signal, and an emitter connected to a second potential.

11. The apparatus of claim 10, wherein said monitoring means in said second circuit further comprises:
a shift register for serially outputting bits of said second priority value over an output line to said transmission means in said second circuit;
a first inverter connected to said output line for inverting the polarity of said priority bits;
a second inverter connected to said allocation line for inverting the polarity of said binary bit state of said allocation line;
a NAND gate having a first input connected to said first inverter and a second input connected to said second inverter, for providing an enabling signal to said transmission means in said second circuit when the binary value of said priority bits is greater than or equal to the binary value of corresponding ones of said binary bit states of said allocation line.

12. The apparatus of claim 11, wherein said inhibiting means in said second circuit further comprises:
a second bipolar transistor having its collector-emitter path connected between said emitter of said first transistor in said second circuit and said second potential, with its base connected to the output of said NAND gate in said second circuit, for preventing said second potential from being applied to said allocation line when the binary bit value of one of said second priority bits is less than the binary value of a corresponding one of said binary bit status of said allocation line.

13. The apparatus of claim 9, which further comprises:
a third priority contention resolution circuit in said first interface unit, including a transmission means having an output connected to said bus allocation line, for sequentially transmitting during a second portion of a third message frame in response to the receipt of said token message from said second interface unit, a third priority value thereover in the form of a multibit binary number with its high order bit first, in a synchronous manner with transmissions of priority values by other interface units contending for the use of said data bus.

14. The apparatus of claim 13, wherein said transmission means in said third circuit further comprises:
a first bipolar transistor having its collector connected to said allocation line and through a resistive impedance to a first potential, a base connected to a source of said third priority value signal, and an emitter connected to a second potential.

15. The apparatus of claim 14, wherein said monitoring means in said third circuit further comprises:
a shift register for serially outputting bits of said third priority value over an output line to said transmission means in said third circuit;
a first inverter connected to said output line for inverting the polarity of said priority bits;
a second inverter connected to said allocation line for inverting the polarity of said binary bit state of said allocation line;
a NAND gate having a first input connected to said first inverter and a second input connected to said second inverter, for providing an enabling signal to said transmission means in said third circuit when the binary value of said priority bits is greater than or equal to the binary value of corresponding ones of said binary bit states of said allocation line.

16. The apparatus of claim 15, wherein said inhibiting means in said third circuit further comprises:
a second bipolar transistor having its collector-emitter path connected between said emitter of said first transistor in said third circuit and said second potential, with its base connected to the output of said NAND gate in said third circuit, for preventing said second potential from being applied to said allocation line when the binary bit value of one of said third priority bits is less than the binary value of a corresponding one of said binary bit status of said allocation line.

17. The apparatus of claim 13, which further comprises:
data transmission means in said first interface unit having a central input connected to said third circuit and an output connected to said data bus, for transmitting said identified message in said next message frame in response to said third priority value being greater than said priority values of said other interface units.

18. In a data transmission system including plurality of bus interface units interconnected by a clock line which defines a periodic message frame, a serial command line, a serial bus allocation line and a data bus, an apparatus for the distributed allocation of the data bus to pending messages to be transmitted thereover in a time division multiple access mode, comprising:
a first priority contention resolution circuit in a first bus interface unit, including a transmission means having an output connected to said command line, for sequentially transmitting during a first message frame, a first priority value thereover in the form of a multibit binary number with its high order bit first, in a synchronous manner with similar transmissions of priority values by other interface units contending for use of said command line;
monitoring means in said first circuit having an input connected to said command line, for cyclically monitoring each sequential binary bit state of said command line and comparing it with the corresponding priority bit value of said first interface unit;
inhibiting means in said first circuit having an input connected to said monitoring means and an output connected to said transmission means, for inhibiting the transmission of said corresponding priority bit if its value is less than the value of said binary bit state of said command line;
said first circuit transmitting a command during said first message frame over said command line to a second bus interface unit connected thereto when said first priority value is greater than said priority values of said other interface units, said command identifying a data message to be sent by said first interface unit over said data bus to said second interface unit;
a second priority contention resolution circuit in a second interface unit intended to receive said data message from said first interface circuit, including a transmission means having an output connected to said bus allocation line, for sequentially transmitting during a first portion of a second message frame in response to the receipt of said command from said first interface unit, a second priority value thereover in the form of a multibit binary number with its high order bit first, in a synchronous manner with transmissions of priority values by other interface units contending for use of said bus allocation line;

monitoring means in said second circuit having an input connected to said bus allocation line, for cyclically monitoring each sequential binary bit state of said bus allocation line and comparing it with the corresponding priority bit value of said second interface unit;

inhibiting means in said second circuit having an input connected to said second circuit's monitoring means and an output connected to said second circuit's transmission means, for inhibiting the transmission of said corresponding priority bit if its value is less than the value of said binary state of said bus allocation line;

said second circuit transmitting a token message during said second message frame over said bus allocation line to said first interface unit connected thereto, when said second priority value is greater than said priority values of said other interface units, said token message indicating that said second bus interface unit is ready to receive said identified data message over said data bus from said first interface unit;

a third priority contention resolution circuit in said first interface unit, including a transmission means having an output connected to said bus allocation line, for sequentially transmitting during a second portion of a third message frame in response to the receipt of said token message from said second interface unit, a third priority value thereover in the form of a multibit binary number with its high order bit first, in a synchronous manner with transmissions of priority values by other interface units contending for use of said data bus;

monitoring means in said third circuit having an input connected to said bus allocation line, for cyclically monitoring each sequential binary bit state in said second portion of said third frame of said bus allocation line and comparing it with the corresponding priority bit value of said first interface unit;

inhibiting means in said third circuit having an input connected to said third circuit's monitoring means and an output connected to said third circuit's transmission means, for inhibiting the transmission of said corresponding priority bit if its value is less than the value of said binary state of said bus allocation line during said second portion of said third message frame;

said third circuit transmitting an allocation message during said second portion of said third message frame over said bus allocation line to said second interface unit connected thereto, when said third priority value is greater than said priority values of said other interface units, said allocation message indicating that said first bus interface unit will be transmitting said identified data message over said data bus to said second interface unit during the next message frame;

data transmission means in said first interface unit having a control input connected to said third circuit and an output connected to said data bus, for transmitting said identified message in said next message frame in response to said third priority value being greater than said priority values of said other interface units.

* * * * *